United States Patent [19]
Lowry

[11] 3,766,478
[45] Oct. 16, 1973

[54] BACKSCATTER REDUCTION APPARATUS

[75] Inventor: Ray B. Lowry, San Diego, Calif.

[73] Assignee: The United States of America as represented by the Secretary of the Navy, Washington, D.C.

[22] Filed: Sept. 8, 1972

[21] Appl. No.: 287,302

[52] U.S. Cl. .......... 325/65, 325/4, 325/8, 325/18, 325/65, 325/67
[51] Int. Cl. .......... H04b 7/14
[58] Field of Search .......... 325/65, 42, 1, 3, 325/6, 12, 18, 67, 2, 8; 343/180

[56] References Cited

UNITED STATES PATENTS 3,696,429 10/1972 Tressa .......... 325/12

*Primary Examiner*—Albert J. Mayer
*Attorney*—R. S. Sciascia et al.

[57] ABSTRACT

Apparatus for reducing $F_1/F_1$ repeater backscatter without significantly changing the desired received signal. A replica signal of the desired transmitted signal on center frequency $F_1$ is transmitted on center frequency $F_2$ to produce a received signal on frequency $F_2$ which is predominantly due to backscatter from the transmission on $F_2$ and which has a very high correlation with the backscatter from the desired transmitted signal on $F_1$. The characteristics of the backscatter on $F_2$ are accurately measured and then correlated to the backscatter on $F_1$ whereby it can be reduced or minimized with relatively minor change of the desired received signal.

7 Claims, 2 Drawing Figures

BACKSCATTER REDUCTION APPARATUS

BACKGROUND OF THE INVENTION

It is well-known that backscatter from the ground or sea limits the gain of airborne or orbital repeater apparatus. Frequency offset techniques between the received and transmitter center frequencies have been used to reduce backscatter of both sampling and non-sampling repeaters. However, frequency offset techniques can only be used advantageously with signals having a very narrow bandwidth, and furthermore the techniques reduce allowable frequency difference between user transmitter and user receiver. Another technique for sampling repeaters comprise a selectively predetermined guard time between transmitter turn-off and receiver turn-on; however, this technique significantly reduces the energy of the desired received signal and the reduction in the energy of the desired received signal is approximately equal to the reduction of the energy of the backscatter signal.

SUMMARY OF THE INVENTION

Apparatus are disclosed for attenuating backscatter from both sampled and non-sampled $F_1/F_1$ repeaters whereby repeater gain can be increased substantially. The apparatus achieves the above without significantly changing the desired received signal on center frequency $F_1$ and without requiring excessive receiver and transmitter frequency adjustments. The apparatus comprises means for transmitting simultaneously on center frequency $F_2$ a replica signal of the desired transmitted signal to produce on $F_2$ a received signal which predominately consists of backscatter and which has a very high correlation with the backscatter on $F_1$. The $F_2$ backscatter further has characteristics which can be accurately ascertained whereby after correlation with $F_1$ backscatter, it can be readily attenuated.

STATEMENT OF THE OBJECTS OF THE INVENTION

It is the primary object of the present invention to provide apparatus for reducing backscatter of $F_1/F_1$ repeaters without significantly changing desired signals to thereby allow increased repeater gain to extend the range of communication systems.

It is a further object of the present invention to provide apparatus as described above which can function independent of modulation type, bandwidth and center frequency of the desired signal.

It is a still further object of the invention to provide apparatus as described above wherein backscatter from a replica signal on center frequency $F_2$ is correlated to backscatter from desired received signals on center frequency $F_1$.

Other objects, advantages and novel features of the invention will become apparent from the following detailed description of the invention when considered in conjunction with the accompanying drawings.

DESCRIPTION OF THE PREFERRED EMBODIMENT

Figures 1, 2:
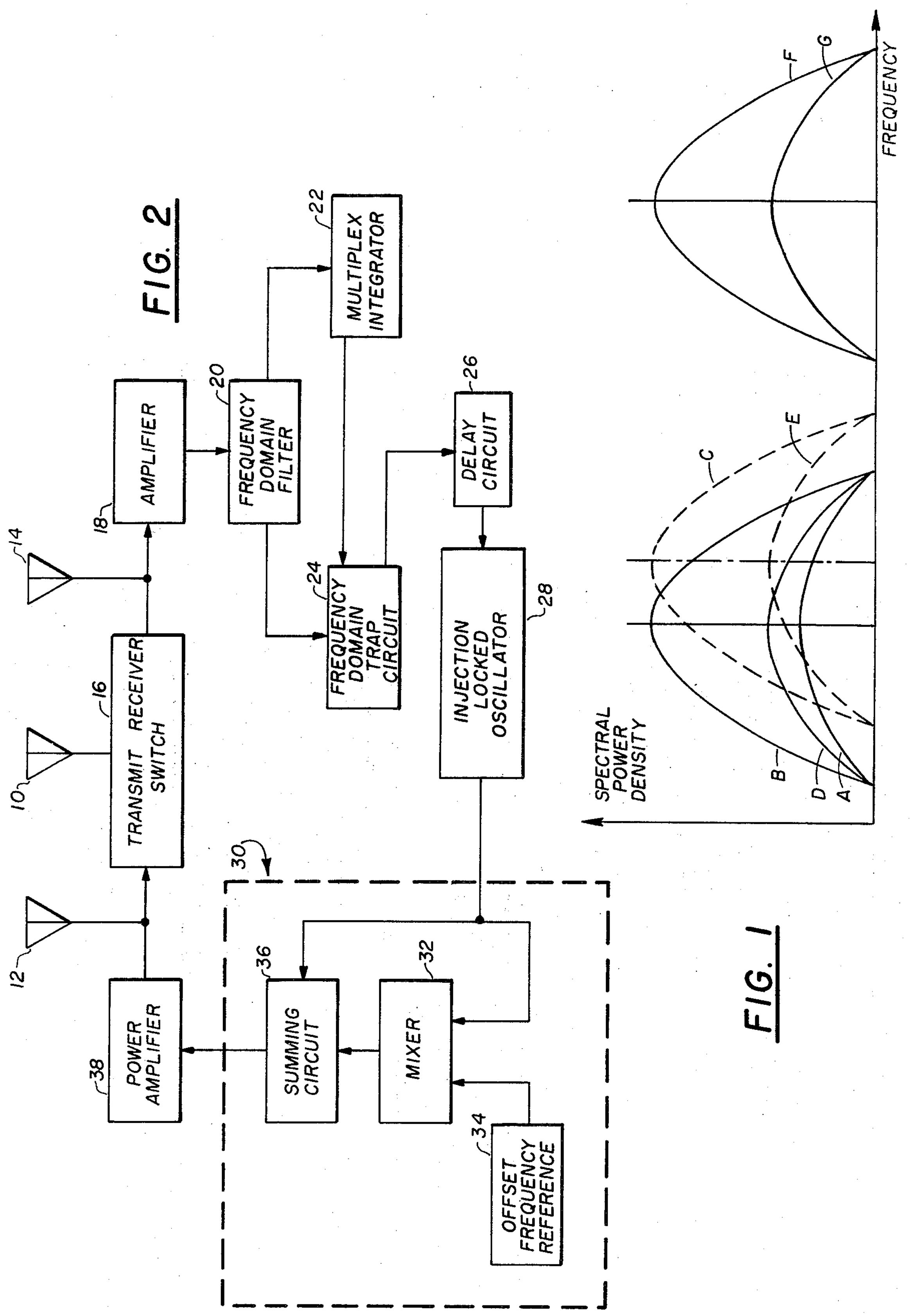
FIG. 1 is a graphical illustration of several exemplary frequency spectrums which are relevant to a complete understanding of the present novel backscatter reduction apparatus and techniques to be described hereinafter.
FIG. 2 is a simplified block diagram of apparatus embodying the present inventive concept.

The essence of the novel inventive concept will initially be disclosed and described with respect to the frequency spectrums illustrated in FIG. 1 wherein waveform A is received by a repeater on center frequency $F_1$. After a selectively predetermined delay period, the waveform B is transmitted on the same frequency $F_1$ or on a slightly offset center frequency $F_1+\Delta$ as shown by the waveform C.

the backscatter from the desired transmitted waveform B is received as either the waveform D on the center frequency $F_1$ or as the waveform E on the center frequency $F_1+\Delta$. The backscatter amplitude may be either smaller or larger than that of the waveform A.

The repeater also transmits a replica of the desired transmitted signal on center frequency $F_2$ as shown by waveform F and also receives the backscatter from the replica transmission on the same center frequency $F_2$ as shown by waveform G.

Frequency $F_1+\Delta$ may be either greater or smaller than frequency $F_1$, i.e., the quantity $\Delta$ may be either positive or negative. Likewise the frequency $F_2$ may be either greater or smaller frequency $F_1$ or frequency $F_1+\Delta$. The replica signal (waveform F) may be either weaker or stronger than the waveforms B or C.

It can be appreciated that it would be extremely difficult to distinguish between the desired signal on center frequency $F_1$ and the backscatter signal on center frequency $F_1$ or $F_1+\Delta$ and to separate the two. Consequently it is very difficult and perhaps impossible to change in any manner either one of these two signals without also changing the other signal in some known or unknown manner.

The received signal on $F_2$ includes a very small amount of the desired received signal on center frequency $F_1$, the transmitted signal on center frequency $F_1$ or $F_1+\Delta$, and the backscatter on center frequency $F_1$ or $F_1+\Delta$. However, the received signal on center frequency $F_2$ is predominately due to backscatter from the replica transmission on center frequency $F_2$.

The pertinent physical characteristics of the backscatter signal produced by the replica transmission on center frequency $F_2$ can be accurately ascertained by means of conventional frequency measurements, and/or phase measurements, and/or relative measurements, and/or time measurements on the received signal on center frequency $F_2$.

As stated earlier a high correlation exists between the backscatter signal from the transmission on center frequency $F_1$ or $F_1+\Delta$ and the received signal on center frequency $F_2$ since the latter is predominately due to the backscatter from the replica transmission on center frequency $F_2$ and since the characteristics of the backscatter on center frequency $F_1$ or $F_1+\Delta$ will be substantially identical to the characteristics of the backscatter on center frequency $F_2$.

Minimal correlation exists between the desired received signal on center frequency $F_1$ and either of the two signals transmitted on center frequency $F_1$ or $F_1+\Delta$ or on center frequency $F_2$. This is so because a selectively predetermined delay period is introduced between the received signal and both transmitted signals. Therefore, minimal correlation or similarity exists between the desired received signal on center frequency $F_1$ and either the backscatter signal on center frequency $F_1$ or $F_1+\Delta$ or the received signal on center frequency $F_2$ since the two backscatter signals are generated by the two transmitted signals.

Consequently, after measuring its revelant characteristics, the backscatter signal from the replica transmission on center frequency $F_2$ can be accurately correlated to the backscatter signal from the desired transmitted signal on center frequency $F_1$ or $F_1+\Delta$, whereby the backscatter signal on $F_1$ can be attenuated (or increased) without significantly changing the desired received signal on center frequency $F_1$.

FIG. 2 is a simplified block diagram of a system which embodies the novel backscatter reduction concept described above. In FIG. 2, signals can be transmitted and received by means of a common antenna 10. If this is done, the transmit signals and the receive signals must be separated by apparatus such as a transmit/receive switch 16, although other devices such as filtered networks, isolation networks, or phase discriminators could also be utilized. Alternatively, signals can be transmitted by the antenna 12, and signals can be received on another antenna 14.

The received signals on $F_1$ and those on $F_2$ from either the antenna 14 or from the switch 16 are first amplified in the amplifier 18. Then the received signals on $F_1$ are separated from the signals on $F_2$ by the frequency domain filter 20. The filter 20 may include a digital filter to enhance its operation.

The separated signals on center frequency $F_2$ are then coupled to a multiplexer integrator 22 which measures the signals to accurately ascertain the pertinent characteristics of the backscatter on center frequency $F_2$. The separted signals on center frequency $F_1$ are coupled to a frequency domain trap circuit which also receives the output from the multiplex integrator 22 and which functions to reduce the backscatter on center frequency $F_1$. The attenuation of the backscatter on center frequency $F_1$ is achieved with no significant change of the desired received signal on center frequency $F_1$.

The output of the trap circuit 24 comprises the received signals on center frequency less attenuated backscatter. This resultant output is delayed in the delay circuit 26 and then processed in the injection locked oscillator 28 to obtain isolation of the transmitted signal from the received signal. The oscillator 28 can also comprise a phase multiplexer, a time multiplexer, or a signal cancellation circuit. It can be appreciated that a portion of the isolation is also provided by the transmit/receive switch 16.

The replica signal on center frequency $F_2$ is then added to the signal on $F_1$ in the circuit 30 which comprises a mixer 32, and an offset frequency reference source 34. The mixer 32 generates the replica signal on center frequency $F_2$ by mixing the signal from the offset frequency reference source with the transmitted signal on center frequency $F_1$ obtained from the injection locked oscillator 28. The output of the mixer is fed to a summing circuit 36 which adds the replica signal on center frequency $F_2$ to the transmitted signal from the oscillator 28 on center frequency $F_1$.

The resultant desired signal which comprises the output from the summing circuit 36 on center frequency $F_1$ or $F_1+\Delta$ plus the replica on center frequency $F_2$ is then amplified in the power amplifier 38. The amplified output is then transmitted on either the transmit antenna 12 or on the common receive/transmit antenna 10.

Thus it can be appreciated that novel apparatus and techniques have been disclosed for reducing backscatter in $F_1/F_1$ repeaters without significantly changing the desired signal and without decreasing the allowable frequency difference between the user transmitter and user receiver. Furthermore the inventive concept can be practiced without regard or concern for modulation type, bandwidth, and center frequency of desired signals.

Obviously many modifications and variations of the present invention are possible in the light of the above teachings. It is therefore to be understood that within the scope of the appended claims the invention may be practiced otherwise than as specifically described.

What is claimed is:

1. Apparatus for attenuating backscatter from $F_1/F_1$ repeaters and comprising:

antenna means for receiving desired signals and corresponding backscatter on center frequency $F_1$ and replica signals of said desired signals on center frequency $F_2$;

means for separating said desired signals and corresponding backscatter on $F_1$ from said replica signals on $F_2$;

means for producing from said replica signal after said separation an output on $F_2$ substantially equal to said backscatter on $F_1$;

means for subtracting said output on $F_2$ from said desired signals and backscatter on $F_1$ to produce a resultant output substantially free from backscatter;

delay means for delaying said resultant output a selectively predetermined time period;

$F_1/F_1$ repeater means for isolating desired signals to be transmitted on $F_1$ from the delayed resultant signal;

means for producing said replica signals on $F_2$;

means for adding said replica signals on $F_2$ to said desired signals to be transmitted on $F_1$ from said $F_1/F_1$ repeater means to produce a desired resultant signal to be transmitted; and, antenna means for transmitting said resultant signal to be transmitted.

2. The apparatus of claim 1 wherein said means for separating said desired signals and backscatter from said replica signals comprises a frequency domain filter circuit.

3. The apparatus of claim 1 wherein said means for producing said output on $F_2$ comprises multiplexer integrator means.

4. The apparatus of claim 1 wherein said means for subtracting said output signal on $F_2$ from said desired signals and backscatter on $F_1$ comprises a frequency domain trap circuit.

5. The apparatus of claim 1 wherein said $F_1/F_1$ repeater means comprises an injection locked oscillator.

6. The apparatus of claim 1 wherein said means for producing said replica signals comprises an $F_2$ offset frequency reference source and a mixer means responsive to the output of said source and to the output of said $F_1/F_1$ repeater means to produce said replica signals on $F_2$.

7. The apparatus of claim 1 wherein said means for adding said signals comprises a summing circuit.

* * * * *